United States Patent [19]
Dixon et al.

[11] Patent Number: 5,853,068
[45] Date of Patent: Dec. 29, 1998

[54] APPARATUS FOR EXCHANGE OF AUTOMOTIVE FLUIDS

[75] Inventors: Patrick Lewis Dixon, Gilbert, Ariz.; Todd Michael Rounds, Orlando, Fla.; Michael Joseph Camacho, Cucamonga, Calif.; Rene' Dean Wiebe, Glendora, Calif.

[73] Assignee: Wynn Oil Company, Azusa, Calif.

[21] Appl. No.: 821,786

[22] Filed: Mar. 21, 1997

[51] Int. Cl.⁶ ............................... F16C 3/14; F16N 33/00
[52] U.S. Cl. ........................ 184/1.5; 184/6.4; 184/6.28; 184/104.3; 184/108; 184/96; 141/95; 141/98; 141/231; 141/331; 134/169 A
[58] Field of Search ................... 184/1.5, 6.4, 6.28, 184/104.3, 105.1, 106, 108, 96, 97; 141/98, 192, 196, 95, 86, 106, 331–333, 231; 165/95; 312/111, 249.8, 229, 223.1, 278; 280/47.26, 47.34, 79.2; 123/196 R, 196 S

[56] References Cited

U.S. PATENT DOCUMENTS

| | | | |
|---|---|---|---|
| 2,552,749 | 5/1951 | Tabet ........................................ 184/1.5 |
| 3,513,941 | 5/1970 | Becnel . | |
| 4,576,330 | 3/1986 | Schepp .................................... 220/325 |
| 4,640,521 | 2/1987 | Berfield ................................. 280/47.34 |
| 4,802,599 | 2/1989 | Hill ........................................ 184/1.5 |
| 5,015,301 | 5/1991 | Baylor et al. ....................... 134/169 A |
| 5,103,994 | 4/1992 | Doxley et al. .......................... 220/908 |
| 5,203,429 | 4/1993 | Zager . | |
| 5,209,198 | 5/1993 | Bedi . | |
| 5,242,032 | 9/1993 | Prestwood et al. . | |
| 5,261,562 | 11/1993 | Prout et al. ............................. 220/908 |
| 5,291,968 | 3/1994 | Brown . | |
| 5,318,080 | 6/1994 | Viken . | |
| 5,318,700 | 6/1994 | Dixon et al. . | |
| 5,337,708 | 8/1994 | Chen . | |
| 5,361,870 | 11/1994 | Courcy . | |
| 5,361,925 | 11/1994 | Wecke et al. ........................... 220/325 |
| 5,370,160 | 12/1994 | Parker . | |
| 5,372,219 | 12/1994 | Peralta ..................................... 184/1.5 |
| 5,415,247 | 5/1995 | Knorr . | |
| 5,427,202 | 6/1995 | Behring et al. . | |
| 5,447,184 | 9/1995 | Betancourt . | |
| 5,472,064 | 12/1995 | Viken . | |
| 5,495,916 | 3/1996 | DiMatteo . | |
| 5,522,474 | 6/1996 | Burman . | |
| 5,546,999 | 8/1996 | Parker . | |
| 5,562,181 | 10/1996 | Elkin et al. . | |
| 5,582,322 | 12/1996 | Prout et al. ............................. 220/908 |
| 5,586,583 | 12/1996 | Edwards et al. . | |
| 5,706,873 | 1/1998 | Benoit et al. ............................ 184/1.5 |

*Primary Examiner*—Christopher Verdier
*Attorney, Agent, or Firm*—Terry L. Miller

[57] ABSTRACT

An automotive fluid service machine for changing fluids such as automatic transmission fluid, power steering fluid, and engine coolant, includes a cabinet with a unitary integral fluid reservoir defined by a lower portion of the machine cabinet. This lower cabinet portion which integrally defines the fluid reservoir also provides a machinery deck to which the components of the machines are mounted. A cap portion of the cabinet provides a cavity for protecting the components mounted to the machinery deck and also provides a control panel for the machine in addition to providing fluid fill and drainage basins improving the convenience and safety of use for the machine. The safety of a service area is improved by the machine because a very low center of gravity for the machine reduces the risk of tipping of a machine and of spilling fluids. Thus, environmental concerns from such spills as well as the risk of personnel slips and falls on spilled fluids are reduced.

16 Claims, 7 Drawing Sheets

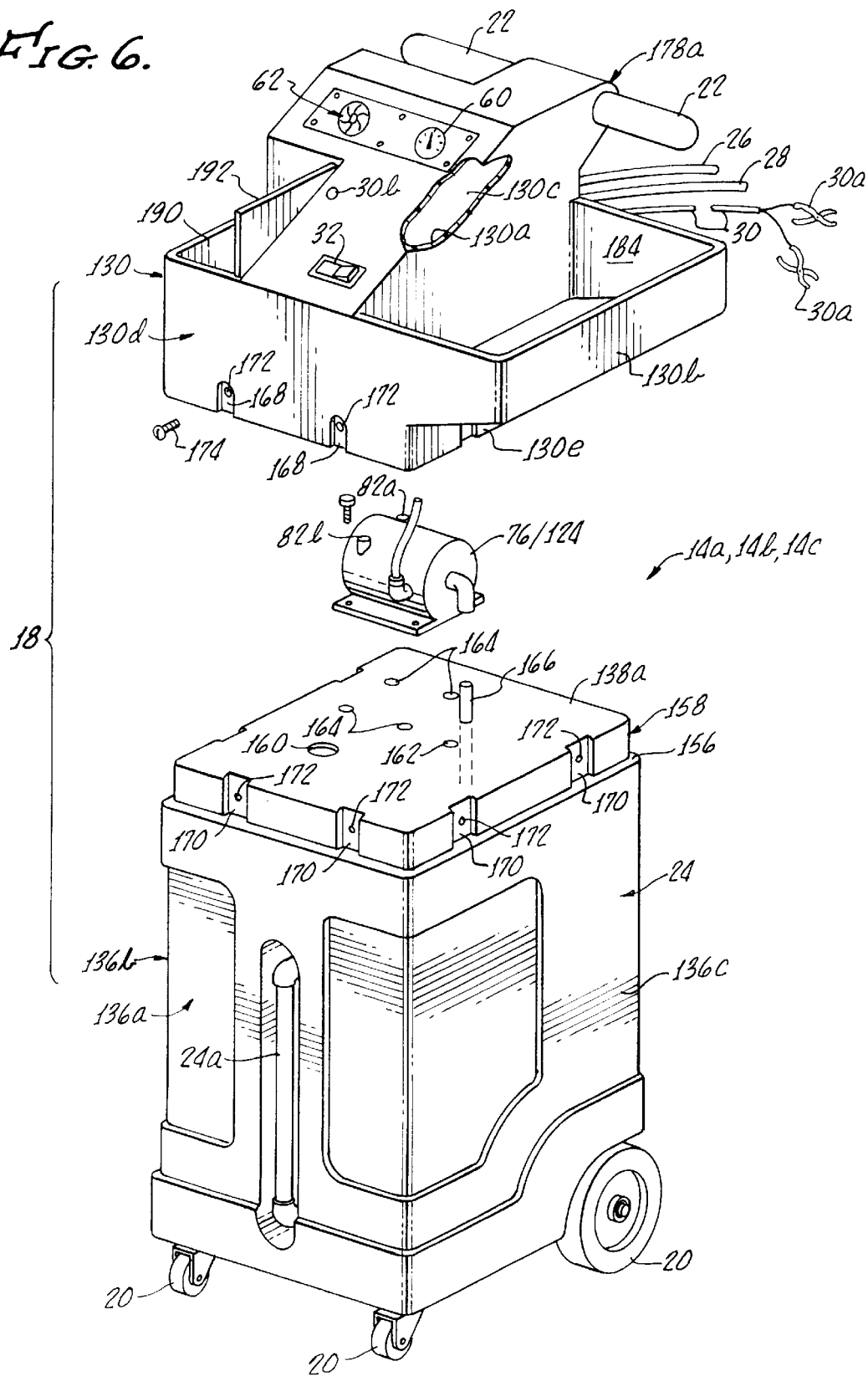

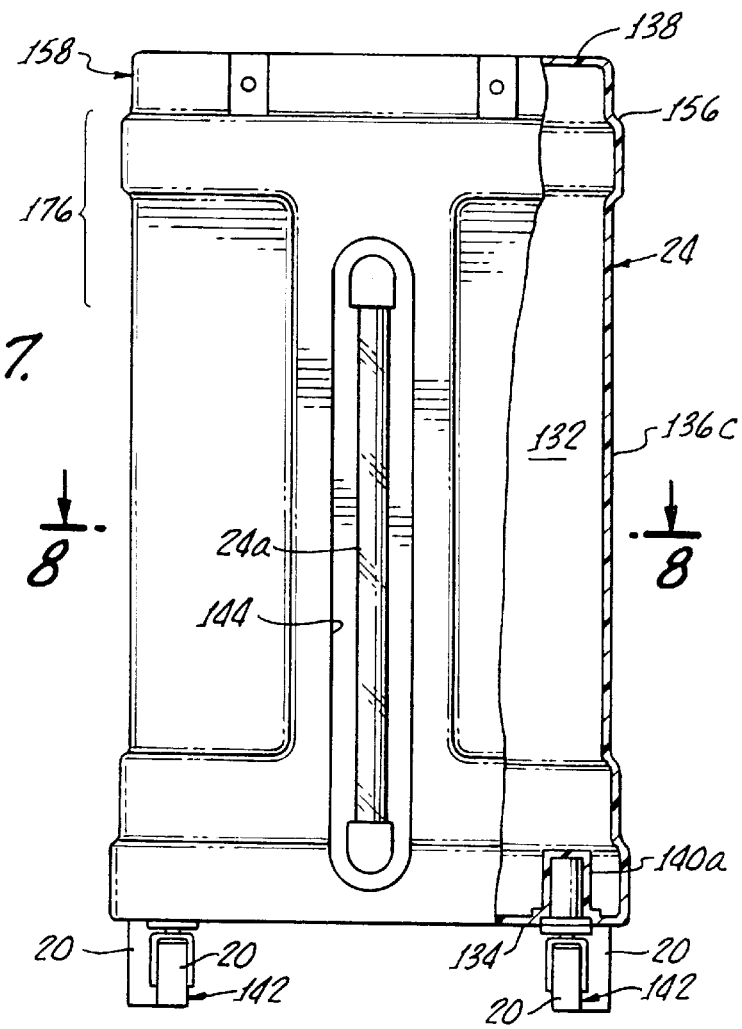
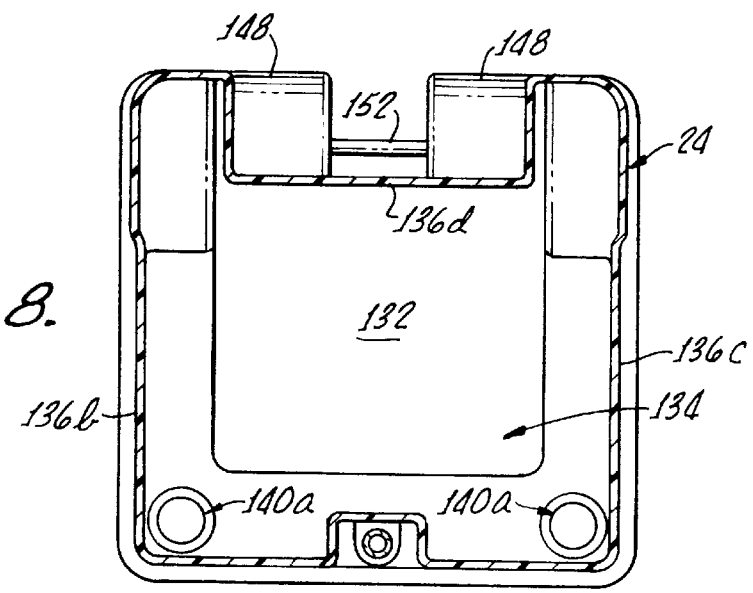

APPARATUS FOR EXCHANGE OF AUTOMOTIVE FLUIDS

The present application is related to subject matter disclosed in United States patent application Ser. No. 08/816,486 filed on 13 Mar. 1997, and assigned to the same assignee as the present application.

BACKGROUND OF THE INVENTION

1. Field of the Invention

The present invention is in the field of apparatus used to effect exchange of fluids from particular systems of an automotive vehicle. The vehicle may be an automobile, truck, bus, or other such automotive vehicle. The inventive apparatus in its differing embodiments may be used to exchange automatic transmission fluid (ATF), power steering fluid, or radiator coolant. More particularly, the present invention relates to a fail-safe machine for use in exchanging the used ATF of an automatic transmission with fresh ATF, or in exchanging used power steering fluid with fresh fluid. An alternative embodiment of the apparatus provides for exchange of radiator coolant. The apparatus is very economical in its construction, and each of the embodiments individually use a unitary cabinet providing an integral reservoir for new fluid as well as a machinery deck and features avoiding spillage of fluids in the service area.

2. Related Technology

Many conventional machines and methodologies presently exist for withdrawing the used ATF from an automotive automatic transmission, while simultaneously replacing the used fluid with new. These devices and methods are a response to the widely-held recognition that simply dropping the pan from an automatic transmission while doing a filter change (or draining the pan of those transmissions fitted with a drain plug), and then refilling the transmission to the proper level with new fluid results in more than half of the old contaminated ATF remaining in the transmission. Such is the case because, for example, the clutch actuators, control valves, pump(s), ATF cooler and connecting conduits, and torque converter of the transmission still hold old ATF. In order to extract this old ATF from the transmission, the vehicle engine must be operated while a fluid exchange for the transmission is in progress.

This operation of the vehicle engine is usually accomplished on a chassis roller set allowing the drive wheels to spin and the clutches of the transmission to be cycled. Operation of the vehicle engine powers the internal fluid pump of the transmission and also facilitates flow of ATF through the torque converter and other parts of the transmission system, effectively flushing out the old ATF and replacing it with new fluid. Alternatively, the vehicle engine can be run with the transmission in "neutral" or "park", with most of the old ATF being exchanged in this way (i.e., without the drive wheels spinning or the transmission clutches being cycled). In this latter case, the old ATF will still be flushed from the torque converter, ATF cooler, and connecting conduits of the transmission system.

Unfortunately, this operation of the vehicle engine creates a risk that the transmission can be damaged or destroyed by dry running. That is, if the old transmission fluid is drained out, and the transmission is not simultaneously refilled with sufficient new fluid so that the fluid level in the transmission drops too low, then the transmission can be damaged by dry running. In some situations, the old ATF is drained out by opening an ATF cooler connection conduit while the vehicle engine is running, and infusing new ATF at the fill tube of the transmission only when bubbles of air are observed to drain also with the ATF from the transmission. These bubbles are an indication that the fluid level of the transmission is low enough that its internal pump is drawing air. AT this time, a dose of new transmission fluid is added via the fill tube of the transmission. In this case, the new transmission fluid may be allowed to partially or completely drain out (perhaps while the attendant is distracted or absent for some reason), and the transmission can be damaged. To be done safely, this method requires the full-time attention of two attendants one to watch the draining ATF and signal the presence of bubbles, and one to infuse new ATF at the fill tube in response to a signal from the first attendant. Obviously, this method is both labor intensive and prone to error.

In other situations, the supply of new ATF available to the service machine is inadequate or has been allowed to run completely out of the service machine to begin with (the attendant may not check to see that a reservoir for new ATF actually holds an adequate supply, for example). Again, a sufficient infusion of new ATF into the transmission may not take place during the service procedure with resulting damage to the vehicle transmission.

Still alternatively, an external power failure to the transmission service machine may occur during the service process, with the vehicle under service still running. This may result in the vehicle running without sufficient ATF in the transmission or with its external transmission cooler loop open and the fluid from the transmission being pumped to waste. Again, transmission damage can result unless the attendant catches this situation early enough.

Accordingly, a desire and a recognized need exists to safely and economically effect the replacement with new ATF of substantially all of the used ATF in an automatic transmission. Unfortunately, many of the machines and methods presently existing for this purpose suffer from one or more of the deficiencies of being ineffective in their service of the transmission (i.e., allowing some of the used fluid to remain in the transmission), possibly resulting in damage to the transmission if not closely attended, or are complex in their construction or operation.

For example, a cleaning machine for an automotive automatic transmission is known according to U.S. Pat. No. 5,337,708, issued 16 Aug. 1994 to We-Yu Chen. The '708 patent is believed to teach a transmission fluid change machine in which an external ATF circulation loop of the transmission is opened, with part of the machine completing this loop in one mode of operation. The used transmission fluid, possibly with a transmission flushing solution, is circulated in the external circulation loop as completed by the machine. When operated in an exchange/refill mode, the machine receives old transmission fluid and supplies new fluid at a selected pressure or volume delivery rate.

The Chen machine is intended to be operated from the 12 volt power supply of the automobile or other automotive vehicle being serviced. The new transmission fluid tank of this device appears to be provided with a level sensor, so that the system can be reverted to loop configuration (filtration/flushing) should the level of new ATF drop too low. An external power-driven pump is utilized to move new ATF from the fluid tank to the transmission being serviced. However, it is not clear from this patent that in the event the power supply to this device is interrupted or the pump ceases to operate, that the configuration of the device is reverted to loop form so that the transmission of the vehicle being serviced is not damaged by being operated with insufficient ATF. Although this patent asserts that a power failure will cause reversion of the apparatus to loop configuration in the event of a power failure, how this change in configuration is to be effected or powered does not appear to be explained.

Another transmission fluid change apparatus is disclosed by U.S. Pat. No. 5,318,080, issued 7 Jun. 1994 to James P. Viken. The '080 patent is believed to disclose an apparatus in which supply of the new ATF is provided by a pressurized storage container, which container is pressurized by the inflow of used ATF pumped from the transmission by its own internal pump. The storage container has a chamber which is separated by a flexible wall (i.e., a rolling-diaphragm piston) into two sub-chambers expanding and contracting in opposition. As used ATF from the transmission is received into one sub-chamber, new ATF is displaced from the other sub-chamber to the transmission. Another embodiment of this device uses two separate containers, one receiving the old ATF and the other holding new ATF. Air displaced from the one container is routed into the other with the idea that the air will drive the new ATF into the transmission. A pressurized air assist to this delivery of new fluid is provided. There is considerable uncertainty with these machines that the rate of new fluid delivery really matches the rate of old fluid draining from the transmission under service.

A transmission service machine is also known according to U.S. Pat. No. 5,370,160, issued 6 Dec. 1994 to Zachary T. Parker. The '160 patent is believed to disclose a service machine in which the external ATF fluid return loop for the transmission is completed by a reservoir from which the fluid is drawn by a pump. Accordingly, in the event that operation of the pump is interrupted while the serviced vehicle continues to operate, the transmission of the vehicle is at risk of damage from dry running. A separate pump is used to supply new ATF to the transmission, but this pump may suffer from the same power supply interruption, so that the transmission is still at risk of damage from dry running. The Parker '160 patent does not appear to provide a closed external ATF circulation loop for the transmission being serviced (other than the one relying on operation of an external power-driven pump), and does not use a three-way valve to complete or open such an external ATF circulation loop.

Still another apparatus for exchanging the fluid of an automatic transmission is known in accord with U.S. Pat. No. 5,447,184, issued 5 Sep. 1995 to Eduardo Betancourt. The '184 patent is believed to disclose an apparatus in which a reservoir for new ATF is provided so that the volume of new fluid supplied to the transmission can exceed the withdrawn volume. The '184 patent appears to include a sensor operating a bell to bring the attendant's attention to the fact that the supply of new ATF is at risk of running out. However, if the attendant is either not close at hand to hear the bell or is inattentive, the transmission may still be damaged if the supply of new ATF runs out while the transmission is being flushed. Still further, the device taught by the '184 patent is not believed to provide any safeguard to protect the automatic transmission in the event of a power failure to the apparatus while the transmission is being flushed during operation.

Finally, another automatic transmission flush apparatus is known according to U.S. Pat. No. 5,472,064, issued 5 Dec. 1995. The feature which the '064 patent appears to contribute to the art is the use of a conventional directional flow control valve. This flow control valve is inserted into the fluid flow conduits connecting the service machine to the external loop of the transmission, and allows connection of the apparatus to the external ATF circulation loop (i.e., the ATF cooler loop) of the transmission with no need to take note of the direction of fluid circulation in this loop. If the internal fluid flow direction of the machine happens to be correct as connected, there is no need to change the valve position. In the event the internal fluid flow direction of the machine is opposite to that of the transmission connection, then reversing the position of the flow control direction valve will match the internal flow direction to the direction of the fluid flow in the external ATF flow loop of the transmission. This machine requires attention and manual intervention of the technician to correct the fluid flow directions so that service can begin in the event that by chance these connections to the transmission are not right to begin with.

Another consideration with automotive vehicles is the exchange of radiator coolant. When the radiator is simply drained and refilled with new coolant, a significant portion of the old coolant remains in the engine. Thus, the new coolant is contaminated with old coolant having rust and deteriorated rust inhibitors in it.

A machine for servicing of the liquid coolant, coolant pump, engine coolant passages, and radiator of a vehicle is seen in U.S. Pat. No. 5,318,700, issued 7 Jun. 1994, and assigned to the same assignee as this application. The disclosure of the '700 patent is incorporated herein by reference to the extend necessary for a complete and enabling disclosure of the present invention.

SUMMARY OF THE INVENTION

In view of the deficiencies of the conventional art, a primary object for this invention is to avoid one or more of these deficiencies.

Another object is to provide a fail-safe automatic transmission service machine.

Yet another object is to provide a machine for exchanging old fluid with fresh fluid in an automotive power steering system.

Still another object is to provide a machine for exchanging the radiator coolant in an automotive vehicle.

Accordingly, the present invention provides a machine for exchanging used ATF with new ATF in an automotive automatic transmission having an internal pump and an external fluid circulation loop, and without limitation on the volume of ATF which can be exchanged.

According to another aspect, the present invention provides a fail-safe transmission fluid exchange machine for an automotive automatic transmission, which automatic transmission includes an internal pump moving automatic transmission fluid (ATF) through an external circulation loop, the machine comprising: a conduit for conducting ATF from the external ATF circulation loop, a three-way valve in a first position communicating ATF received via the first conduit from the external circulation loop to a second conduit, which second conduit returns ATF to the external ATF circulation loop, the three-way valve in a second position thereof communicating ATF from the external ATF circulation loop to waste; a yieldably-biased back-driveable actuator which when actuated moves the three-way valve from the first to the second position thereof and which when deactivated returns the three-way valve to the first position by self-bias; a container for holding a supply of new ATF; a sensor for indicating when the container holds an adequate supply of new ATF; a pump receiving new ATF from the container therefor and supplying the new ATF pressurized via the second conduit to the external ATF circulation loop; a control system interconnecting the pump, the sensor, and the actuator to allow actuation of the actuator to place the three-way valve in the second position only while the sensor indicates an adequate supply of new ATF, the control system deactivating the actuator in the event of an inadequate supply of new ATF to allow the three-way valve to be returned to the first position by self-bias of the actuator.

A machine for exchanging power steering fluid includes essentially the same elements as the one for exchanging ATF, except that the reservoir of the machine is filled with power steering fluid, and adapters are provided and used to interrupt the low-pressure return hose of the power steering system.

Yet another version of the present machine is provided with a pump, and adapters are provided and used to interrupt one of the conduits communicating radiator coolant between the engine and radiator of a vehicle. The pump provides for withdrawal of new coolant from the reservoir of the machine and introduction of this new fluid into the cooling system of the vehicle as the old coolant is flushed out.

In each of its embodiments, the machine uses a unitary cabinet having a base portion providing an integral reservoir for new fluid, and also providing a machinery deck upon which the particular machinery necessary for the embodiment is installed. The base portion cooperates with an upper control portion which also provides for fluid introduction and drainage to the machine, as well as holding a control panel and providing for easy movement of the machine about a service area.

An advantage of the present machine resides in its use of a cabinet with an integral lower reservoir. Consequently, the use of a separate reservoir for new fluid is avoided, the machine is provided with a low center of gravity which reduces the risk of tipping over of the machine and spilling of the fluids, provision is made for introduction of new fluid and for drain back of fluid after a service into the machine—further reducing the occurrences of fluid spillage about a service area. The reduction of fluid spillage in a service area has the double benefit of reducing environmental concerns for fluid loss into the environment, and also decreases the risks of slips and falls in the service area occurring because of personnel stepping in spilled and slippery fluids.

A better understanding of the present invention will be obtained from reading the following description of alternative exemplary preferred embodiments of the present invention taken in conjunction with the appended drawing Figures. It will be understood that the appended drawing Figures and description here following relate only to exemplary preferred embodiments of the invention, and as such, are not to be taken as implying a limitation on the invention. No such limitation on the invention is implied, and none is to be inferred.

BRIEF DESCRIPTION OF THE DRAWING FIGURES

FIG. 1 provides a pictorial representation of an automotive service area provided with three machines embodying the present invention—one each for service of automatic transmissions, of power steering systems, and for radiator coolant flushing. FIG. 1 also provides a fragmentary pictorial depiction of an automobile having its automatic transmission serviced by use of one of the machines embodying the present invention;

FIG. 2 is a schematic representation of automobile power train (engine and transmission) as well as the transmission service machine seen in FIG. 1, and depicts alternative modes of operation (or fluid flow paths) utilized during the servicing of the transmission;

FIG. 3, provides a perspective view of a motor/pump unit used in each of the transmission service machine and in the power steering service machine seen in FIG. 1, and is shown with the housing of this motor/pump illustrated in phantom lines for improved clarity of description;

FIG. 4 provides a schematic representation of an automotive power steering system, during servicing to exchange old fluid with fresh fluid using a machine and method according to the present invention;

FIG. 5 provides a schematic depiction of the cooling system of an automotive vehicle, and illustrates exchange of radiator coolant (i.e., antifreeze) using a machine according to the present invention;

FIG. 6 is an exploded perspective view of an exemplary machine embodying the present invention; and provides a better view of the machine cabinet with a unitary base portion having an integral fluid reservoir, of a cap portion having provision for fluid filling and drain back, and with a portion of this cap being broken away for improved illustration;

FIG. 7 provides front elevation view, partially in cross section, of the base portion of the machine;

FIG. 8 is a horizontal cross sectional view taken at line 8—8 of FIG. 7;

FIG. 9 provides a perspective view of the rear of the service machine;

FIG. 10 is a top plan view of the machine showing features of a cap portion of the machine cabinet and of a control panel of the machine; and FIG. 11 is a cross sectional elevation view of a cap portion of the cabinet (taken at line 11—11 of FIG. 10), and showing fluid filling and drain back features of the machine.

DETAILED DESCRIPTION OF EXEMPLARY PREFERRED EMBODIMENTS OF THE INVENTION

Figure 1:
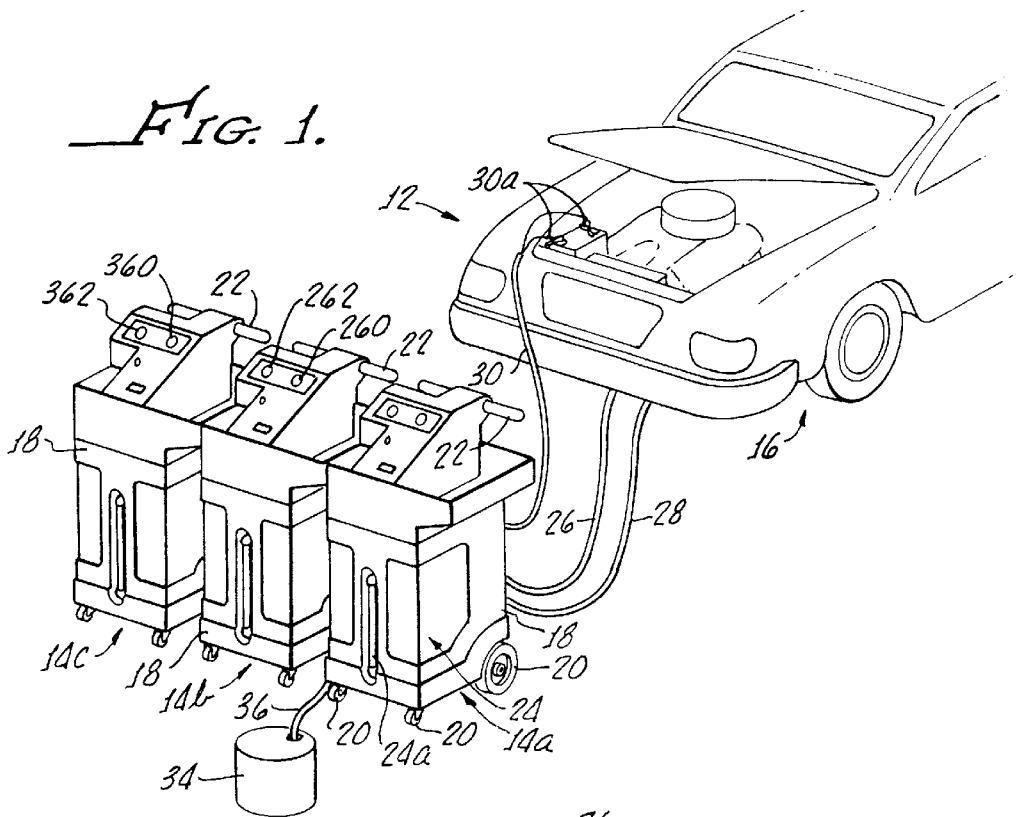

Referring to FIG. 1, a service bay or area 12 for automotive vehicles is fragmentarily depicted. This service area 12 is provided with three service machines, indicated respectively with numerals 14a, 14b, and 14c, each embodying the present invention. Because the machines 14a, 14b, and 14c share many features in common, the numeral 14 alone will be used to refer to them all in common. The service machines 14a, 14b, and 14c are respectively for service of the automatic transmission, for service of the power steering system, and for service of the radiator coolant of a vehicle. By "radiator coolant" is meant the liquid engine coolant circulated through a radiator of a vehicle with a liquid-cooled engine for transferring engine waste heat to the ambient air. Usually, this radiator coolant is a mixture of water and antifreeze. Also, it will be appreciated that in this instance, "service" means exchange of the used fluid from the systems of an automotive vehicle with fresh fluid. A flushing of the respective system of the vehicle to remove dirt, oxidation products, wear particles, and other such contaminants, may be conducted prior to or simultaneously with the fluid exchange operation.

Viewing now FIG. 1 in greater detail, an automotive vehicle 16 is seen having its automatic transmission serviced by use of one of the machines 14. In this case, the vehicle transmission is being serviced by use of fail-safe machine 14a embodying the present invention. It will be understood that the vehicle 16 is illustrative only, and that other types of automotive vehicles may have their transmissions serviced by use of the machine 14a. For example, some heavy trucks and buses use automatic transmissions, which also may be serviced in the way described below. Similarly, the power steering service machine 14b can be used on a variety of differing vehicles, as can the coolant service machine 14c.

In general view and as an introduction to the machines 14, it is seen that the machines each include a cabinet, generally indicated with the numeral 18, having four wheels 20 and a handle 22 providing for the machine to be rolled about the service area to an appropriate position next to a vehicle to be serviced, as is seen in FIG. 1. Each of the machines 14a, 14b, and 14c have this and several other aspects in common, so that description of one of them will suffice to describe each. In fact, as will be further described and explained below, the machines 14a, 14b, and 14c each include a respective cabinet of a design common to all three of these machines. In other words, the cabinets 18a, 18b, 18c (respectively) of each of the three machines are essentially identical, and include multi-function component parts which will be further described below.

The machines 14a, 14b, and 14c will be seen to have a very low center of gravity so that they are exceptionally stable both while stationary and during movement on their wheels about the service area. Such low center of gravity is provided by the machines 14a, 14b, and 14c because essentially an entire lower portion 24 of the cabinet 18 defines a reservoir (hereinafter "reservoir portion 24") for new fluid. The reservoir portion 24 serves as a base also for the machines 14, as will be seen. When this reservoir portion is filled with new fluid, the weight of the new fluid is located at a low level in the machine, and provides an exceptionally low and stable center of gravity.

Continuing with a consideration of FIG. 1, it is seen that the machine 14a is connected to the vehicle 16 in two respects. First, the machine 14a is connected by a pair of hoses 26 and 28 to the transmission cooling fluid circuit of the vehicle 16, as will be explained. Secondly, the machine 14a is electrically connected in this case by a cable 30 to receive electrical power from the vehicle 16. The cable 30 attaches by respective clamps (each indicated with numeral 30a) to the appropriate terminals of the vehicle battery. Electrical power connection to the machine 14 is indicated by an indicator lamp 30b. The machines 14 requires no line power (i.e., no 110 volt or 220 volt AC power, for example), and the transmission and power steering machines 14a and 14b use only a small current of electrical power from the vehicle 16 to operate a fail-safe function of the machines. The radiator coolant machine 14c uses a somewhat greater but still modest flow of current from the vehicle being serviced in order to power a fluid exchange pump, as will be explained.

The front of each of the machines 14 is provided with a vertically extending sight glass 24a (actually formed of break-resistant and somewhat flexible plastic tubing—not glass) providing an indication of the fluid level in the reservoir portion 24 of the machines 14. Still viewing FIG. 1, it is seen that during service of the transmission of vehicle 16, the vehicle engine is run, and the vehicle may be in neutral or park, or may be on a chassis roller stand allowing the drive wheels of the vehicle to spin with the vehicle stationary. In this situation, the internal pump(s) of the transmission will be operating, and used ATF will flow from the vehicle transmission via hose 26 to the machine 14a. During an initial transmission flushing mode of operation, the used ATF (possibly with a flushing chemical added for this phase of transmission cleaning during which varnish and debris in the transmission are loosened for removal) flows back to the transmission via hose 28. In other words, in a flushing mode of operation, the machine 14a completes an external closed fluid flow loop for the vehicle transmission.

However, when a service technician actuates a switch 32, the machine 14a enters an AFT exchange mode of operation. In this exchange mode of operation, used ATF flows from the transmission to machine 14a, and then to a container 34 via a hose 36 for recycling or appropriate disposal. The hose 36 may simply be routed to a large used-fluid storage tank (not seen in the drawing Figures) which is maintained by some service facilities for this purpose. The service area 12 in this case will have access to many conveniently located inlets to this storage tank, and the container 34 will not be needed. Simultaneously, new ATF is supplied by the machine 14a from the reservoir 24 into the transmission of the vehicle via hose 28. While this AFT exchange process is going on the fluid flow rates in the hoses 26 and 28 are substantially matched to one another by the machine 14a. Accordingly, the fluid level in the transmission of the vehicle 16 can not drop too low, and transmission damage from dry running can not occur.

In the event the reservoir 24 is allowed to run out of new ATF, the machine 14a will either not enter fluid exchange mode, or will automatically revert from this mode to flush (i.e., recirculation) mode. Again, dry running of the vehicle transmission can not occur. Also, in the event that power to the machine 14a is interrupted (i.e., if one of the clamps 30a becomes disconnected, for example), then the machine 14a reverts instantly to flush mode without the need for manual attention from an attendant and without power being required to effect this reversion to flush mode.

Figure 2:
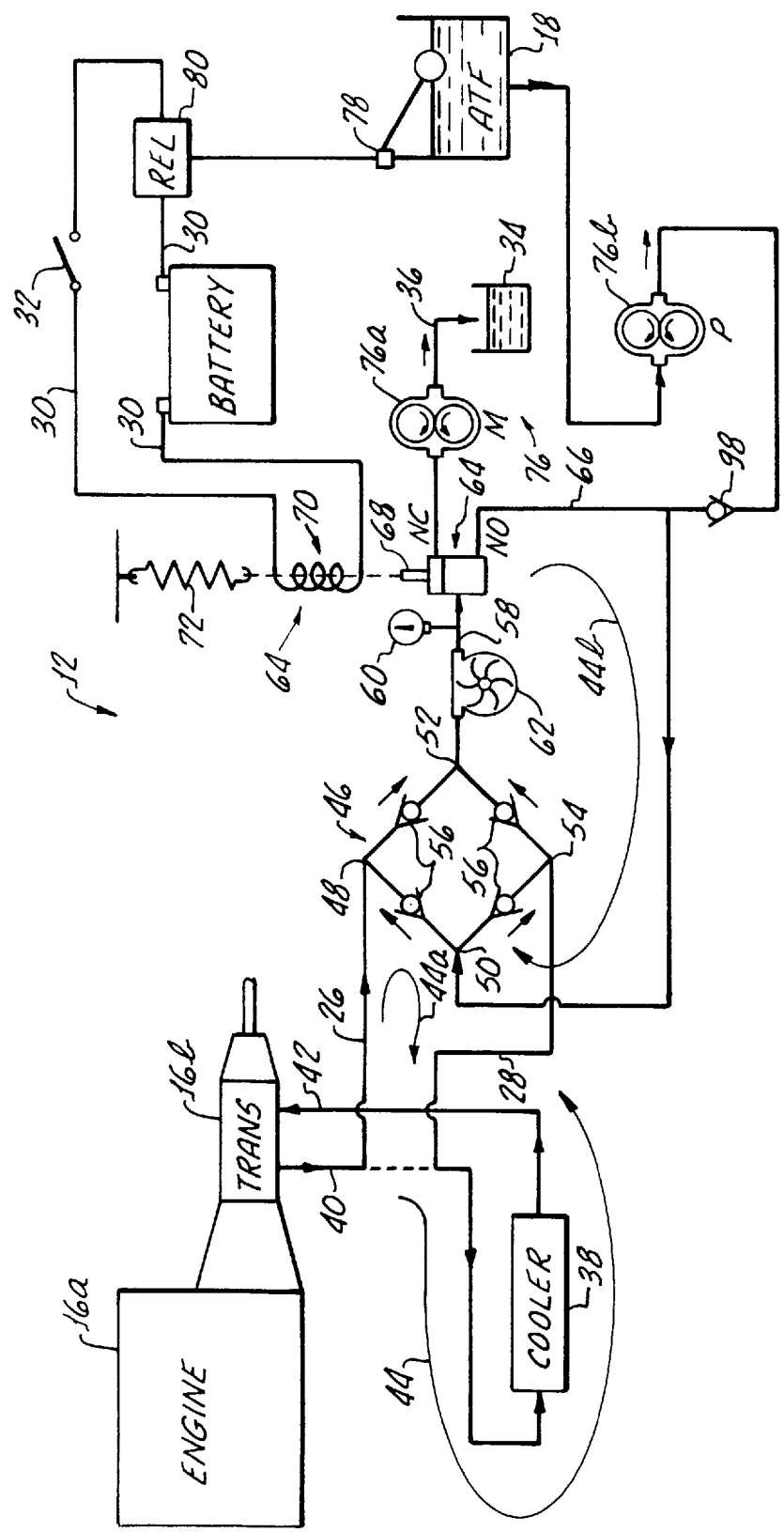

Attention now to FIG. 2 will reveal a schematic of the plumbing and functional structures of the machine 14a. The engine and transmission of the vehicle 16 are indicated with numerals 16a and 16b, respectively. Those ordinarily skilled in the pertinent arts will understand that the transmission 16b is associated with a transmission fluid cooler 38 of the vehicle 16. Ordinarily, this transmission cooler 38 is built into a portion of the vehicle coolant radiator and is an ATF-to-engine-coolant type. Alternatively, the transmission cooler 38 may be configured as a separate ATF-to-air heat exchanger, which is usually installed behind the grill of the vehicle. In some cases, vehicles are equipped with both types of ATF coolers. The cooler 38 is connected in fluid flow to the transmission 16b by conduits 40 and 42, with ATF flow directions in these conduits being indicated by the arrows on FIG. 2. The conduits 40, 42, and cooler 38 cooperatively define an external closed ATF circulation loop for the transmission 16b, which external closed fluid circulation loop is indicated by numeral 44 on FIG. 2.

Conduit 40 is shown in FIG. 2 with a portion of its length depicted in dashed line. When the vehicle 16 is in normal operation, the dashed line portion of conduit 40 is connected together, and fluid flows from the transmission to the cooler 38 along this conduit. However, during service of the transmission using machine 14a, one of the conduits 40 or 42 is interrupted as suggested in FIG. 2, and the machine 14a is connected into the previously-closed ATF circulation loop 44 for cooler 38. In FIG. 2, conduit 40 is the one shown opened for connection of machine 14a. However, either of the conduits 40 or 42 may be so opened, dependent upon which one is most easily accessible to the service technician on each particular vehicle to be serviced. Either of conduits 40 or 42 may be accessed for service of the transmission with absolutely no difference in the effectiveness of the service performed. In preparation for and during the transmission service, the accessed one of the conduits 40 or 42 is interrupted, and after the service is complete the connection of the conduit is restored to its original fluid flow continuity.

Machine 14a includes a fluid-flow rectifier assembly, indicated with numeral 46. This rectifier assembly includes four nodes (or fluid flow confluences and branchings) respectively indicated with numerals 48, 50, 52, and 54; and also includes four check valves each indicated with a respective numeral 56. The check valves 56 are each disposed between a connected pair of the nodes 48–54, and are oriented as shown in FIG. 2. As is seen in FIG. 2, hose 26 connects to node 48, and the hose 28 connects to node 54. The check valves 56 are each oriented so that fluid can flow only to node 52 and only away from node 50. Accordingly, no matter which way the hoses 26 and 28 are connected to the opened ends of the interrupted one of conduits 40 or 42, ATF flow is always from one of nodes 48 or 54 to node 52, and from the node 50 to the other one of nodes 48 and 54. Node 52 is connected by a conduit 58 including a pressure gauge 60 and a flow meter 62 to the common port of a spring-loaded three-way solenoid valve 64. The flow meter 62 has a visible indicator 62a of fluid flow, which is displayed on the front of the machine 14a, as is seen in FIG. 1. Each of the machines 14a and 14b are the same in this respect, as will be further explained below.

The solenoid valve 64 has a normally-open (N.O.) port from which a conduit 66 connects to node 50. Accordingly, a closed loop fluid flow connection is provided by machine 14a which completes loop 44. For purposes of illustration, this closed fluid flow loop within machine 14a is indicated on FIG. 2 with two loop arrows referenced with numerals 44a and 44b —although they cooperatively indicate a single closed loop fluid flow path. During flush mode of operation as described above, the machine 14a completes the circulation loop 44 by flow of ATF in the internal loop indicated with numerals 44a and 44b of FIG. 2. During this circulation of ATF in the machine 14a, the service technician can observe the available pressure provided by the internal pump of the transmission 16b at gauge 60, seen on the front of machine 14a in FIG. 1.

Further considering the three-way solenoid valve 64, it is seen that this solenoid valve includes a valve portion 64a and a solenoid actuator portion 64b. The solenoid actuator portion 64b includes an armature member 68 movably disposed within a solenoid coil 70, and a spring 72 biasing the armature 68 toward a first position. The armature member 68 interacts with the valve portion 64a so that when the armature 68 is in its first position the common port is connected only to the N.O. port of the valve portion 64a. When the solenoid coil 70 is actuated electrically, armature member 68 is moved to a second position (not shown) in which the common port of the valve portion 64a is connected only to the N.C. port of this valve portion. The N.C. port of solenoid valve 64 connects via a conduit 74 to one portion (a motor portion) of a motor/pump unit 76. From this motor portion (indicated with numeral 76a), fluid flows via a hose 36 to the waste-fluid container 34.

The machine 14a is also provided with a float switch 78 at reservoir 24, which electrically allows connection of the common port of solenoid valve 64 to the N.C. port only if a sufficient volume of new ATF is in this reservoir, and which closes if the level of this new ATF falls too low. Float switch 78 controls a relay 80 in circuit with the switch 32, solenoid coil 70, and the battery of the vehicle 16 via cable 30. When the service technician closes switch 32, solenoid coil 70 is actuated if relay 80 allows (i.e., if the float switch 78 indicates a sufficient level of new ATF in the reservoir 24), and the common port of solenoid valve 64 is switched from communication with the N.O. port to communication to the N.C. port. Thus, the internal closed ATF circulation loop of the machine 14a (recalling arrows 44a and 44b) is opened, and used ATF from the transmission 16b flows to waste container 34.

Figure 3:
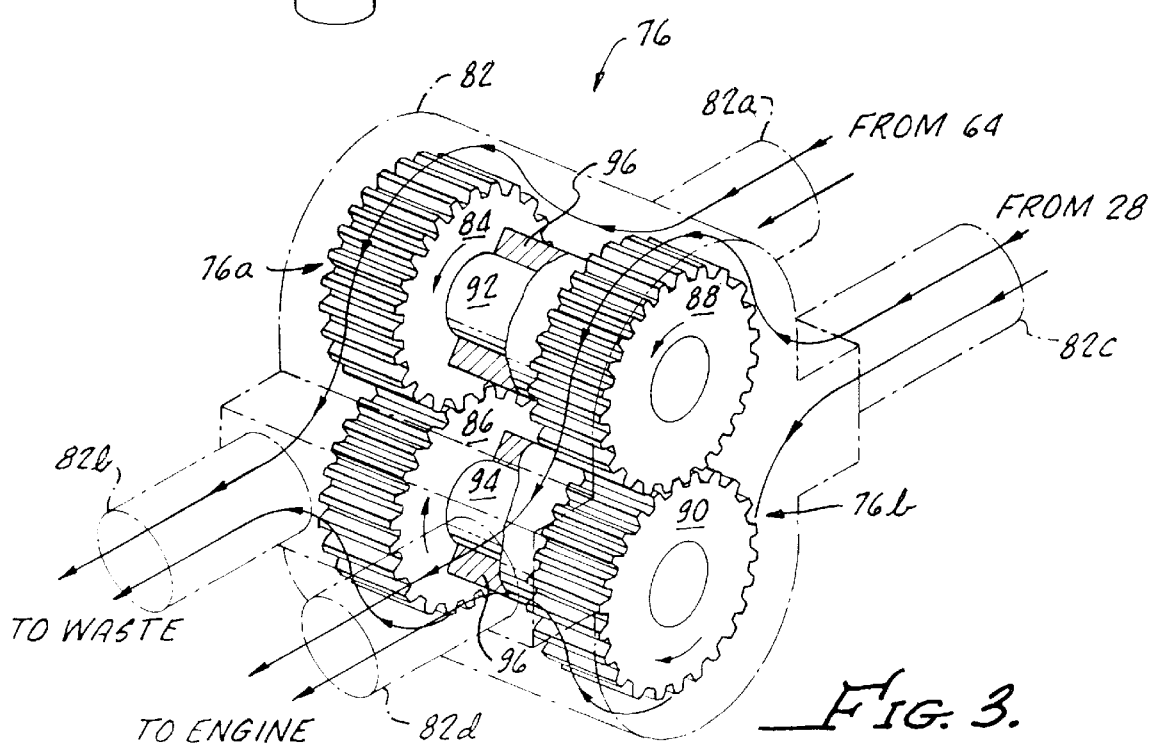

Considering now FIG. 3, it is seen that the motor/pump unit 76 includes a housing 82 defining an inlet port 82a and outlet port 82b from motor portion 76a. Similarly, the housing 82 defines an inlet port 82c and outlet port 82d to and from a pump portion 76b. The motor portion 76a and pump portion 76b are each defined by a meshed pair of spur gears (respectively indicated with numerals 84, 86, 88, and 90. The housing 82 defines closely fitted chambers for these meshed gears, which is conventional in the art of spur-gear pumps and motors. However, in this case, the housing 82 also journals a pair of connecting shafts, indicated with numerals 92 and 94. The shafts 92 and 94 drivingly connect the indicated spur gears for rotation in unison, as is indicated by the arrows on FIG. 3. Thus, as used ATF flows through the motor portion 76a (from port 82a to port 82b) of motor/pump unit 76 the gears 84 and 86 are forced to rotate as indicated, driving the gears 88 and 90 in rotation via shafts 92 and 94. The motor/pump unit 76 is a positive-displacement fluid motor/pump unit, with each side having identically the same fluid displacement per rotation of the gears 84–90 (ignoring some slight and insignificant volume of fluid which may leak from the motor portion to the pump portion of the unit).

Further to the above, it is seen that according to the illustrated embodiment of the motor/pump unit 76, the housing 82 carries a pair of elongate plain journal bearings 96 (only a portion of each being seen in FIG. 3 for clarity of illustration). These journal bearings 96 are closely and precisely fitted to the shafts 92 and 94 so that these shafts (and the gears 84–90) are very free running. Importantly, the close fitting of these journal bearings and shafts is relied upon to effect a sufficient fluid seal between the motor side and pump side of the motor/pump 76 so that only an insignificantly small amount of ATF flows along the shafts 92, 94 without the use of a contact type of sealing element. Consequently, no significant mixing of old ATF with new ATF takes place in the motor/pump unit 76.

Those ordinarily skilled in the pertinent arts will recognize that other sealing expedients are possible in motor/pump unit 76, and which also provide for free running of the internal components of this unit. For example, a labyrinth seal could be used along the length of the shafts 92 and 94 to inhibit fluid flow between the motor and pump portions of this unit, still without the use of a contact sealing element. Alternatively, a low-friction type of contact sealing element can be used on the shafts 92, 94. This may take the form of, for example, a carbon ring face seal, or a low-friction radial lip seal disposed between the housing 74 and each of the shafts 92, 94. In each case, the motor/pump unit 76 can achieve motoring and pumping operation utilizing only a relatively low fluid pressure provided by the internal pump of transmission 16b. This makes transmission servicing possible even with the engine 16a idling.

Accordingly, during fluid exchange mode new ATF is drawn from reservoir 24, flows from port 82c to port 82d of the pump portion 76b of motor/pump unit 76, and is delivered to the loop 44a/b via a check valve 98. This new ATF flows to the node 50, and then to the one of the hoses 26 and 28 which is connecting to the connection at the conduits 40 and 42 having the lower pressure.

It will be recalled in view of the above, that fluid flow in the apparatus seen in FIG. 2 is being impelled entirely by the internal pump of the automatic transmission 16*b*. Accordingly, there is a progressive pressure drop along the length of all flow paths, and the fluid flow at the connections to one of conduits 40 and 42 will be differentiated from one another by this fluid pressure differential. Accordingly, no matter which one of the conduits 40 or 42 is interrupted for transmission service, and no matter which way the hoses 26 and 28 are connected to the open ends of the interrupted conduit 40 or 42, flow of used ATF will be from one of these open ends of the interrupted conduit 40 or 42, and flow of new ATF will be delivered by the machine 14*a* into the other open end of the interrupted conduit.

In other words, the circulation loop 44 of the transmission 16*b* is complete during flush mode and appears to be complete during exchange mode also, but during exchange mode new ATF is being supplied by the machine 14*a* in response to and in matching volume to the pumping out of old ATF by the transmission 16*b*. During this fluid exchange mode of operation, the technician can verify that fluid is flowing by observing the indicator 62*a* of flow meter 62. Preferably, this flow meter is a turbine type with a transparent wall though which the technician can not only see the spinning turbine, but can also observe the color and turbidity of the ATF flowing from the transmission to waste (i.e., this is visible on the front of machine 14*a* as seen in FIG. 1). Thus, when the out-flowing ATF is observed to change from the turbid burnt-umber of old fluid to the clear bright red of new fluid, the technician knows that the flushing and fluid exchanging operation is complete.

To repeat, in the event the level of new ATF in reservoir 24 drops too low during the service process, and even if the attendant is not present, the float switch 78 will open electrically, and as a result the spring-loaded solenoid 64*b* will return valve 64*a* to the position connecting the common port only to the N.O. port. This takes place due to its own spring bias and the fact that the solenoid actuator 64*b* can be back-driven by this spring bias. Thus, in the event of cessation of operation of the machine 14*a* (because of interruption of electrical power, for example) or a shortage of fresh transmission fluid, the loop 44 is restored, withdrawal of transmission fluid stops, and the transmission 16*b* can not run out of fluid or be damaged by dry running.

When the process described above is complete, the technician disconnects the machine 14*a* at the connections to one of the conduits 40 or 42, restores the circulation loop 44, and sends the old transmission fluid for disposal or to a recycling facility.

Figure 4:
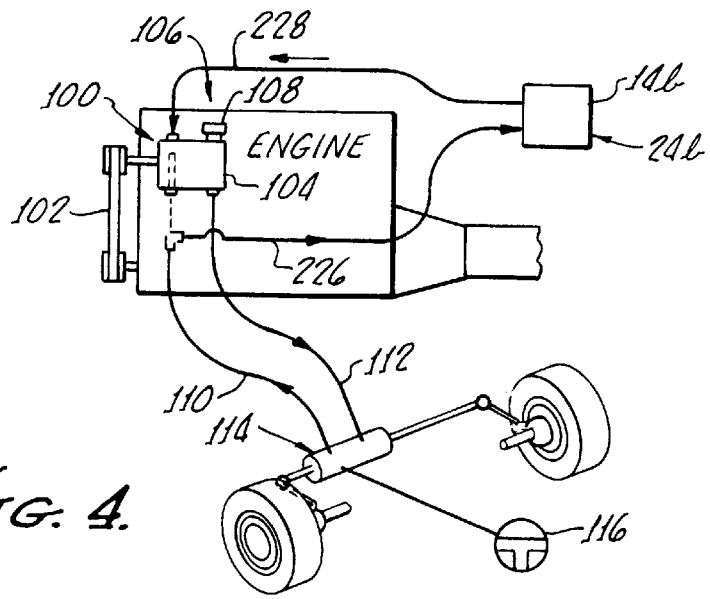

FIG. 4 schematically illustrates the use of the power steering service version 14*b* of the machine 14. This embodiment of the present invention (in which the machine is used to service the power steering system of a vehicle to exchange old fluid from the system with new fluid) is the same as version 14*a*, except that the reservoir 24 of the machine is filled with power steering fluid. Additionally, a slight difference in the connection of the machine into the power steering system of a vehicle is necessary. Accordingly, in order to obtain reference numerals for use in describing this alternative embodiment of the invention, features which are either the same as those depicted and described above, or which are analogous in structure or function, are referenced in FIG. 4 using the same numeral used above, and having two-hundred (200) added.

Viewing now FIG. 4, a vehicle includes an engine 116*a* driving a power steering pump 100 by means of a belt 102. This pump 100 includes a reservoir portion 104 disposed generally above the pump 100. The reservoir portion 104 has a fill opening 106 closed by a cap 108. Also, a low-pressure hose 110 connects onto a fitting on the body of the reservoir portion 104 in order to allow return of low pressure power steering fluid into this reservoir. During operation of the engine, the pump 100 draws power steering fluid from the reservoir portion 104, and delivers this fluid pressurized via a high-pressure hose or conduit 112 to a power steering unit 114. The power steering unit 114 is connected to the dirigible wheels of the vehicle, and has a steering input from a steering wheel 116.

Now, in order to allow a machine 14*b* to be used in exchanging fluid from the power steering system seen in FIG. 4, preferably the low pressure hose 110 is interrupted or disconnected at its connection to the fitting at reservoir portion 104. This disconnection of the hose 110 allows it to be connected to one of the hoses 126 or 128 of the machine 14*b*. In view of the explanation above of the hydraulic rectifier 42, it will be appreciated that either hose 126 or hose 128 may be connected to receive low-pressure power steering fluid from the system as depicted. The other hose 126 or 128 from machine 14*b* is either attached to the fitting on the reservoir 104 from which hose 110 was disconnected, or is simply routed so as to deliver fluid into the reservoir 104 via fill opening 106.

Accordingly, when the engine 116*a* is operated, the pump 100 is powered and delivers high-pressure power steering fluid to the unit 114. Power steering fluid at a lower pressure flows from the unit 114 via hose 110, but is routed to machine 14*b* rather than flowing into reservoir 104. This power steering fluid is routed to machine 14*b*, where it powers a motor/pump unit as described above. The machine 14*b* is provided with a source of new power steering fluid (i.e., in its respective reservoir portion—here indicated with numeral 124*b*), which will be easily understood in view of the description above of providing machine 14*a* with a source of automatic transmission fluid. The motor/pump unit of the machine 14*b* delivers new power steering fluid at a matching volume rate to the reservoir 104 of the pump 100 via hose 128. It will be recalled that hoses 126, and 128 can be reversed in function, as will be appreciated in view of the operation of the hydraulic rectifier of machine 14*a* as described above. That is, the machines 14*a* and 14*b* are the same in this respect. In this way, the old power steering fluid is removed from the system depicted in FIG. 4, and the system is provided with new power steering fluid. In the event that the low-pressure hose of the power steering system is less easily accessed than the high-pressure hose, the machine 14*b* can be connected into the system by interrupting the high-pressure hose between the power steering pump and the steering gear. In this case, the new power steering fluid supplied by machine 14*b* can be connected into the steering gear for a complete flushing of the power steering system, or can be connected into the reservoir of the power steering pump.

Figure 5:
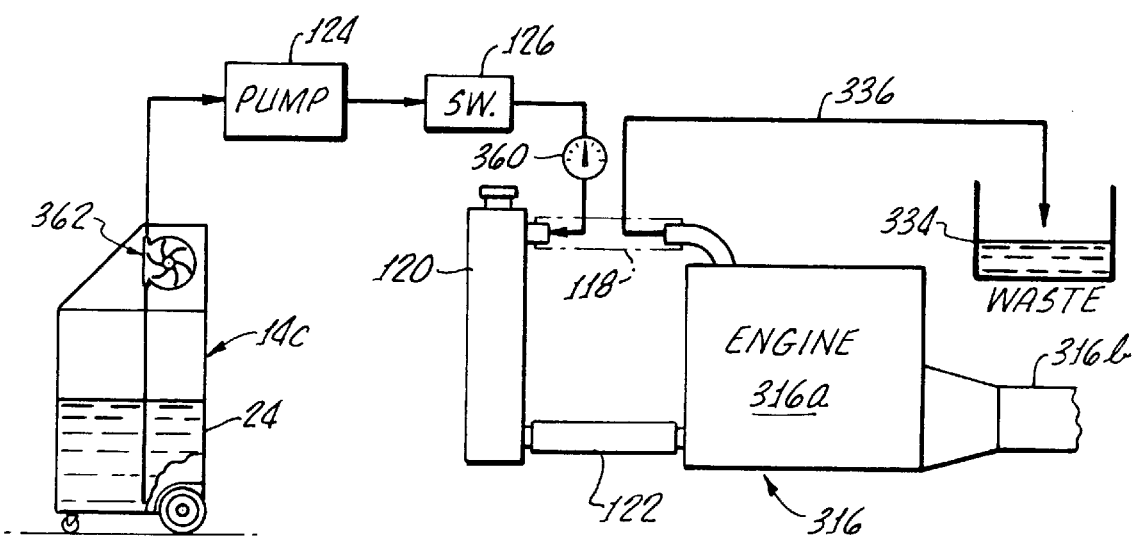
Figure 9:
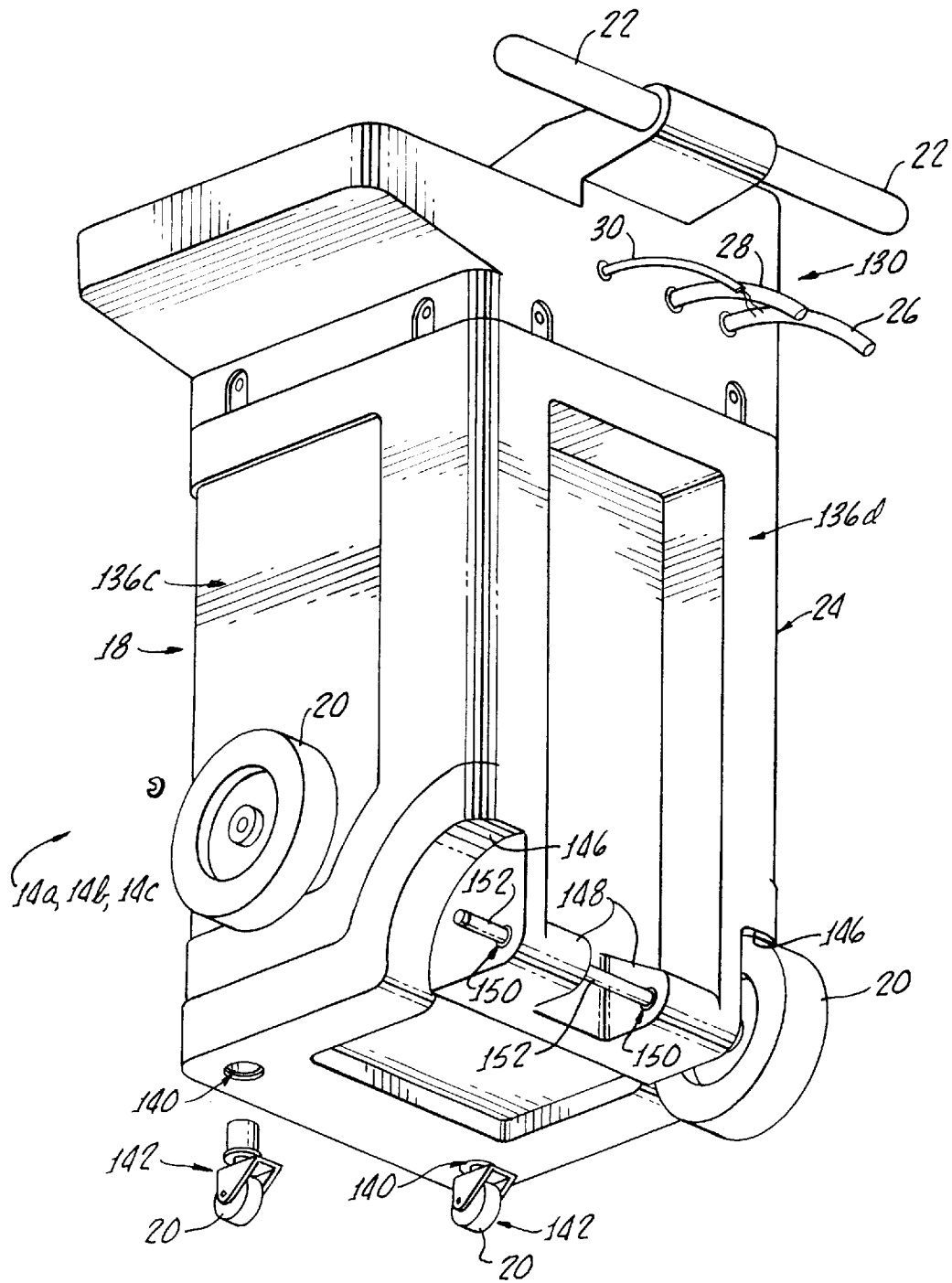

Considering now FIG. 5, this Figure schematically illustrates the use of the radiator coolant version 14*c* of the service machine 14 to service the coolant system of a vehicle. That is, the machine 14*c* is used to exchange old antifreeze fluid from the engine coolant system of a vehicle with new antifreeze. This version of the machine 14 includes the same cabinet 18, but uses an electrically powered pump unit (rather than a fluid-power motor/pump unit) to effect movement of new fluid from the reservoir of the machine into the cooling system of a vehicle being serviced. In order to obtain reference numerals for use in describing this alternative embodiment of the invention, features which are either the same as those depicted and described above, or which are analogous in structure or function, are referenced in FIG. 5 using the same numeral used above, and having three-hundred (300) added.

Viewing now FIG. 5, a vehicle includes an engine 316a having an engine-driven coolant pump (not shown) which operates when the engine is running. When the engine has achieved operating temperature, a coolant thermostat (also not shown) of the engine will be open, and coolant will circulate from the engine via an upper radiator hose 118 (shown in dashed lines) to a radiator 120, as is well understood in the pertinent arts. From the radiator 120, cooled liquid coolant flows back to the engine 316a via a lower radiator hose 122.

In order to allow machine 14c to be used in exchanging fluid from the cooling system of the vehicle 316, the upper radiator hose 118 is disconnected from its hose nipple at the radiator 120. Upper hose 118 is then connected to a hose 336 leading to a waste or recycling container 334. The machine 14c includes an electrically driven pump 124 (schematically indicated in FIG. 5 outside of the cabinet for machine 14c but actually located on the machinery deck of the reservoir portion, as is easily understood in light of the description above).

This pump 124 draws new antifreeze fluid from reservoir portion 24 of the machine 14c via a flow indicator 362. The pump 124 delivers the new antifreeze fluid to the radiator 120 of the vehicle 316.

As the old antifreeze is pumped out of the vehicle engine by the engine-driven coolant pump (i.e., the water pump of the engine 316a), new antifreeze is provided by machine 14c. Thus, the old antifreeze fluid from the cooling system of the vehicle 316 is completely exchanged with new antifreeze. An over-pressure switch 126 is provided, and is electrically connected in series with pump 124 to open the electrical circuit and stop this pump in the event of pressure above a set limit being supplied into the radiator 120. Thus, the radiator 120 and cooling system of the vehicle can not be damaged by excessive pressure applied to the new antifreeze in the event that the vehicle has an obstruction in the cooling system, for example. A situation in which such an excessive pressure could be experienced is with a vehicle having a defective thermostat (i.e., one that is stuck shut or does not open properly as the engine warms up). The pressure gauge 360 is provided so that a service technician can observe the pressure of new antifreeze being delivered by the pump 124 to the vehicle being serviced.

Attention now to FIGS. 6–11 in conjunction with one another will reveal features of the cabinet 18 used for each of the machines 14a, 14b, and 14c. That is, a cabinet of common design and structure is used to make each of the machines 14. The machines 14a and 14b differ from one another primarily in the fluid placed into the reservoir portion of the machines, and in the adapters and fittings used to interface the machines with the respective transmission and power steering systems of a vehicle. On the other hand, the machine 14c differs from the other two machines by using an electrically-driven pump to displace antifreeze from the reservoir portion of the machine into the cooling system of a vehicle, as was explained above.

The cabinet 18 is seen to include the lower base or reservoir portion 24, and to also include an upper cap portion 130. As will be seen, the cap portion provides environmental protection for components of the machine mounted on a machinery deck of the base portion 24 and within the cap portion. Preferably, the lower portion 24 is spin molded of plastic resin material, and defines an inner reservoir chamber 132 comprising substantially the entire inner volume of this lower reservoir portion 24. The reservoir chamber 132 is substantially closed except for the openings described, and is thus substantially free of leakage paths by which fluid may leak or drip from the machine 14. Considering the lower portion 24 in some detail, it is seen that this portion includes a lower wall 134, four side walls indicated with numerals 136a, 136b, 136c, and 136d; and a top wall 138 having an upper surface 138a. The walls 134, 136a–d, and 138 are all integral with one another. In fact, all of the features of the base portion 24 are integral with one another and are formed of a single piece of plastic resin as can be appreciated from the fact that this part is preferably spin molded. Consequently, the reservoir portion 24 is substantially leak-free.

Inwardly, the walls 134, 136, and 138 cooperate with each other to define the chamber 132. Outwardly, these walls also cooperate with one another to define the lower portion 24 of the cabinet 18. The lower wall 134 outwardly defines the lower surface 134a for the cabinet, and inwardly defines a floor for the cavity 132. This lower wall 134 adjacent to the front corners of the cabinet 18 defines a pair of upwardly extending closed sockets 140 each receiving a respective caster wheel assembly 142. The wheels carried by these caster wheel assemblies 142 are two of the four wheels 20 referred to above. Inwardly of the wall 134, the sockets 140 each define a respective protrusion 140a into the cavity 132, as is best seen in FIG. 8.

The front wall 136a defines an elongate recess 144 for receiving the sight glass tube 24a. Adjacent the top and bottom of this recess, an opening is formed through the front wall 136a to allow fluid communication with sight glass 24a. Viewing FIG. 9, it is seen that the side walls 136b and 136c cooperated with lower wall 134 to define a pair of arcuate recesses 146 each adjacent to a respective one of a pair of downwardly and rearwardly extending bosses, each indicated with numeral 148. These bosses 148 each define a respective one of a pair of aligned bores 150 receiving an axle shaft 152. The bores 150 are open at their opposite ends, but do not open into cavity 132. Consequently, no leakage path for fluid is provided by this feature of the cabinet 18. Projecting end portions 152a of the axle 152 (only one of which is visible in FIG. 9) receive respective ones of the wheels 20, and a respective snap ring retainer 154 is received on the axle shaft 150 to retain each of these wheels.

Adjacent to its upper extent, each of the side walls 136a–d defines an inward offset cooperatively defining a ledge surface 156 circumscribing the lower portion 24. Inwardly of this ledge surface, the walls 136a–d define cooperatively a boss 158 of slightly reduced horizontal dimension in comparison to that of the lower portion 24 below the ledge 156 so that the cap portion 130 can seat on this ledge. Above the boss 158, the surface 138a of wall 138 provides a machinery deck, upon which some of the devices or components of the machines 14 are mounted. As is seen viewing FIG. 6, the upper wall 138 defines a pair of holes 160, 162 each opening to the chamber 132 for a purpose to be explained. Also, the wall 138 has respective openings (not referenced on FIG. 6, but indicated collectively with numeral 164), each receiving a fastener for mounting the pump 76 or 124 to wall 138, as is indicated in FIG. 6. Regardless of which type of pump is mounted to the cabinet 18, the pump will have a suction tube 166 connecting to an inlet port of the pump and extending through a respective opening in wall 138 toward the bottom of reservoir 132.

Understandably, this suction tube allows the pump 76 or 124 to draw new fluid from reservoir 132 when the pump is operated.

Considering the cap portion 130 now in greater detail, it is seen that this portion of the machines 14 is also molded of plastic resin material. The cap portion 130 may be molded of sheet vacuum-forming resin, for example. Accordingly, the cap member will be understood to have comparatively thin continuous wall portions 130a (as opposed to solid sections). The outer surfaces 130b of the walls 130a are seen in the various views (excepting FIG. 11 which shows inner surfaces of these walls as well), and these walls inwardly define a cavity 130c (i.e., an interior space above the machinery deck 138a). The walls 130a define a circumferentially extending skirt section 130d which circumscribes boss 158, and a downwardly disposed end edge 130e which engages upon ledge surface 156 of the portion 24.

In order to secure the cap member 130 onto the lower portion 24, the skirt section 130d defines plural vertically extending key sections 168 each aligning with and being received into a respective vertically extending key way 170 of the boss 158. The key sections and key ways each define respective aligning through holes 172 receiving a respective one of plural threaded fasteners 174. Conventional sheet metal screws are acceptable for use as fasteners 174, as is explained immediately below. That is, although the fasteners 174 pass through the walls of portion 24 to the chamber 132, fluid leakage from these holes is not a significant risk. This is because the chamber 132 includes a generous ullage volume above the upper extent of the sight glass 24a, indicated by the vertical dimension 176 seen in FIG. 7. Accordingly, the chamber 132 includes a considerable safety dimension (i.e., the vertical dimension indicated at 176) and a considerable volume for receiving excess fluid above the upper extent of the sight glass without leakage of fluid through the openings 172. Preferably, the chamber 132 is filled only to the upper extent of the sight glass 24a, so a service technician need not be especially diligent and careful during filling of a machine 14. A considerable over-filling of the reservoir 132 is permissible, and still the level of liquid in chamber 132 will not reach the height of the openings 172 because of the generous ullage volume 176.

Further considering FIGS. 6–11, and recalling the descriptions above of the operative components of the machines 14, is seen that the cap portion 130 provides in cavity 130c, and above machinery deck 138a, a sufficient space for the components including pump 76 or 124 to be mounted or housed (i.e., the components depicted schematically in FIG. 2 including the solenoid valve 64 and rectifier 46 in the case of machines 14a and 14b). Machine 14c has only the pump 124 and pressure switch 126 to be housed in cavity 130c (the pressure switch 126 is preferably integral with the pump 124); along with the pressure gauge 360 and flow indicator 362, switch 332, and indicator light 330b (which are panel mounted).

Figure 10:
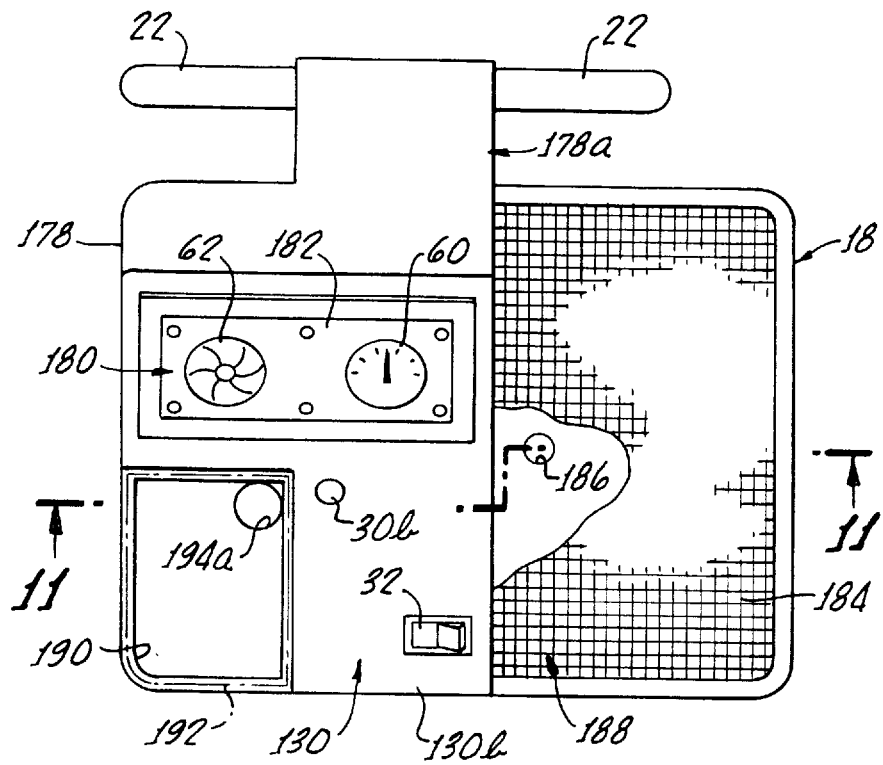

As is seen particularly in FIGS. 6 and 10, the cap portion 130 includes an upwardly extending turret or housing portion 178 over cavity 130c, and this turret defines a rectangular opening 180 to cavity 130b within which is received and secured a control panel 182. The pressure gauge 60 and flow indicator 62 are mounted in this panel 182. Also, the indicator lamp 30b and switch 32 may be mounted to panel 182 if desired. In FIG. 6, a side wall of this housing portion 178 is broken away only for purposes of illustration, to allow viewing of the cavity 130c. A rearward protrusion 178a of this turret 178 provides for mounting of the handles 22 to the machine.

Figure 11:
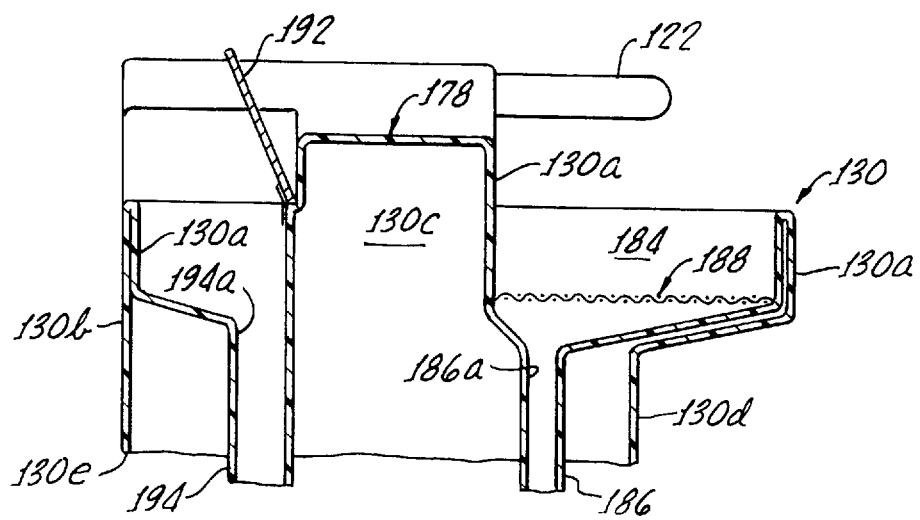

Along the right-hand side of turret 178 (viewing the machines from the front, as seen in FIG. 1), the cap portion 130 defines an elongate drain basin 184. FIG. 11 shows that a downwardly extending spigot portion 186 of the cap 130 has an opening 184a to basin 184 and extends downwardly from this basin, rather like a funnel. The spigot portion 186 is received in opening 162 defined in the upper wall 138 of reservoir portion 24, recalling the explanation above. In order to allow fittings and adapters used in the fluid exchange process to be drained in the basin 184, a grate member 188 is fitted into the bottom of the basin 184. By use of the drain basin 184 to receive and drain such fitting and adapters, a service technician can substantially avoid dripping slippery fluids about the service area—with an improved safety and avoidance of slips and falls for such service personnel.

Similarly, along the left-hand side of turret 178, near the front of machine 14, the cap portion 130 defines a fill-basin 190. This fill-basin 190 is provided with a hinged lid 192 which overlies and closed this basin by its own weight (indicated by the arrow on FIGS. 6 and 11) unless held open to allow the machine 14 to be filled at reservoir 132 with a particular fresh fluid for use in fluid exchange operations. FIG. 11 shows that a spigot portion 194 of the cap 130 has an opening 194a to fill-basin 190 and extends downwardly from this basin also like a funnel. The spigot portion 194 is received in opening 160 defined in the upper wall 138 of reservoir portion 24. The fill basin allows the machines 14 to be rolled to a bulk fluid storage area for filling, or to be filled from pails, cans, or jugs of new fluids. The fill basin 190 provides a convenient funnel-like access into the reservoir chamber 132 for filling purposes so that the potential for spills from this source is also reduced.

In view of the above, it is seen that the present invention provides an automotive fluid service machine having a unitary integral fluid reservoir defined by a portion of the cabinet for the machine. This cabinet portion which integrally defines the fluid reservoir also provides a machinery deck to which the components of the machines can be mounted. Also, the cap portion of the cabinet provides a cavity for protecting the components mounted to the machinery deck and also provides a control panel for the machines in addition to providing convenience and safety improving fill and drainage basins. The safety of the service area is improved because of the very low center of gravity for these machines. Tipping of a machine and spilling of fluids with attendant environmental concerns from such spills (as well as the risk of personnel slips and falls on spilled fluids) is reduced.

While the present invention has been depicted, described, and is defined by reference to a single particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. Thus, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A fail-safe automotive fluid service machine for exchanging old automatic transmission fluid from an automatic transmission and replacing this old automatic transmission fluid with new automatic transmission fluid, which automatic transmission includes an internal pump moving automatic transmission fluid through an external cooler circulation loop, said machine comprising:

a conduit for conducting automatic transmission fluid from said external cooler circulation loop, a three-way valve in a first position communicating automatic transmission fluid received via said first conduit from said external cooler circulation loop to a second conduit, which second conduit returns automatic transmission fluid to said external cooler circulation loop, said three-way valve in a second position thereof communicating automatic transmission fluid from said external cooler circulation loop to waste;

a yieldably-biased back-driveable actuator which when actuated moves said three-way valve from said first to said second position thereof and which when deactivated returns said three-way valve to said first position by self-bias;

a cabinet, said cabinet having a unitary chambered base portion with a lower wall, side walls, and a top wall all integral with one another and cooperatively defining a reservoir cavity within said base portion, said reservoir cavity holding a supply of new automatic transmission fluid; said top wall upwardly defining a machinery deck; a sensor for indicating when said reservoir cavity holds an adequate supply of new automatic transmission fluid; a pump secured to said machinery deck and having a suction tube communicating with a lower extent of said reservoir cavity to withdraw liquid therefrom; said pump supplying said new automatic transmission fluid pressurized via said second conduit to said external cooler circulation loop;

a control system interconnecting said sensor and said actuator to allow actuation of said actuator to place said three-way valve in said second position only while said sensor indicates an adequate supply of new automatic transmission fluid, said control system deactivating said actuator in the event of an inadequate supply of new automatic transmission fluid to allow said three-way valve to be returned to said first position by said self-bias of said actuator; and a cap portion of said cabinet covering said machinery deck and providing environmental protection to said pump.

2. The fail-safe transmission fluid exchange machine of claim 1 further including a hydraulic motor driven by used automatic transmission fluid pumped from said transmission by said internal pump and driving said pump of said fluid exchange machine.

3. The fail-safe transmission fluid exchange machine of claim 1 further including a hydraulic rectifier allowing either of said first conduit or said second conduit to be connected in said external cooler circulation loop of said transmission so as to receive old automatic transmission fluid pumped by the internal pump of the transmission, and allowing either one of said first conduit or said second conduit to be connected into the external fluid circulation loop of the transmission so as to deliver new automatic transmission fluid to the cooler circulation loop;

said hydraulic rectifier including four fluid flow nodes, each of said four nodes being in direct fluid flow communication with two other of said four nodes, two of said nodes being bi-directional nodes which may receive fluid from said transmission or send fluid to said transmission, and a different two of said four nodes being respectively one an inflow node at which said machine receives old automatic transmission fluid from the transmission and an outflow node to which the machine delivers new automatic transmission fluid, said first and said second conduits each connecting to a respective one of said bi-directional nodes; and four check valves interposed each one between two directly communicating nodes, said check valves being disposed such as to allow flow from each bi-directional node only to said inflow node and only from said outflow node to each of said bi-directional nodes.

4. A fail-safe automotive fluid service machine for exchanging old power steering fluid from a vehicle power steering system having a power steering pump and a reservoir, and replacing this old power steering fluid with new power steering fluid, said machine comprising:

a first conduit for conducting power steering fluid from a conduit of said power steering system, a three-way valve in a first position communicating power steering fluid received via said first conduit from said power steering system to a second conduit, which second conduit returns power steering fluid to said power steering system, said three-way valve in a second position thereof communicating power steering fluid from said power steering system to waste;

a yieldably-biased back-driveable actuator which when actuated moves said three-way valve from said first to said second position thereof and which when deactivated returns said three-way valve to said first position by self-bias;

a cabinet, said cabinet having a unitary chambered base portion with a lower wall, side walls, and a top wall all integral with one another and cooperatively defining a reservoir cavity within said base portion, said reservoir cavity holding a supply of new power steering fluid; said top wall upwardly defining a machinery deck; a sensor for indicating when said reservoir cavity holds an adequate supply of new power steering fluid; a pump secured to said machinery deck and having a suction tube communicating with a lower extent of said reservoir cavity to withdraw liquid therefrom; said pump supplying said new power steering fluid pressurized via said second conduit to said power steering system;

a control system interconnecting said sensor and said actuator to allow actuation of said actuator to place said three-way valve in said second position only while said sensor indicates an adequate supply of new power steering fluid, said control system deactivating said actuator in the event of an inadequate supply of new power steering fluid to allow said three-way valve to be returned to said first position by said self-bias of said actuator; and a cap portion of said cabinet covering said machinery deck and providing environmental protection to said pump.

5. The fail-safe fluid exchange machine of claim 4 further including a hydraulic motor driven by used power steering fluid pumped from said power steering system by said power steering pump and driving said pump of said fluid exchange machine.

6. The fail-safe fluid exchange machine of claim 4 further including a hydraulic rectifier allowing either of said first conduit or said second conduit to be connected in one of a low-pressure conduit or high-pressure conduit of said power steering system so as to receive old power steering fluid pumped by the power steering pump, and allowing either one of said first conduit or said second conduit to be connected with one of the reservoir of said power steering system so as to deliver new power steering fluid to the power steering system;

said hydraulic rectifier including four fluid flow nodes, each of said four nodes being in direct fluid flow communication with two other of said four nodes, two of said nodes being bi-directional nodes which may receive fluid from said power steering system or send fluid to said power steering system, and a different two of said four nodes being respectively one an inflow node at which said machine receives old power steering fluid from the power steering system and an outflow node to which the machine delivers new power steering fluid, said first and said second conduits each connecting to a respective one of said bi-directional nodes; and four check valves interposed each one between two directly communicating nodes, said check valves being disposed such as to allow flow from each bi-directional node only to said inflow node and only from said outflow node to each of said bi-directional nodes.

7. An automotive fluid service machine, said machine comprising:

a cabinet, said cabinet having a unitary chambered base portion with a lower wall, side walls, and a top wall all integral with one another and cooperatively defining a reservoir cavity within said base portion, said top wall upwardly defining a machinery deck;

a pump secured to said machinery deck and having a suction tube communicating with a lower extent of said reservoir cavity to withdraw liquid therefrom;

a cap portion of said cabinet covering said machinery deck and providing environmental protection to said pump;

wherein said base portion further includes means for attaching ground-engaging wheels at said lower wall, thereby to allow said machine to be rolled about an automotive service area; and wherein said means for attaching wheels at said lower wall includes said lower wall defining a pair of downwardly opening closed sockets, said pair of sockets each defining a corresponding protrusion inwardly of said reservoir cavity, one of a pair of caster assemblies received in each of said pair of sockets, said caster assemblies each carrying a respective ground-engaging wheel for said machine.

8. The automotive fluid service machine of claim 7 wherein said means for attaching wheels at said base portion includes a rear one of said side walls and adjacent side walls each cooperatively defining one of a pair of opposite arcuate recesses, said rear wall defining a rearwardly extending boss having a bore aligning centrally with said pair of recesses, an axle member received in said bore, and a pair of wheels each received on said axle member and disposed in one of said pair of arcuate recesses.

9. The automotive fluid service machine of claim 7 wherein a front one of said side walls defines a vertically extending recess extending from adjacent a lower extent of said reservoir cavity toward but short of an upper extent of said reservoir cavity, a vertically extending sight glass tube disposed in said recess and communicating with said reservoir cavity and upper and lower ends thereof, thereby to provide a visible indication of the fill level of liquid within said reservoir cavity.

10. The automotive fluid service machine of claim 9 wherein an upper end of said recess and sight glass tube is disposed a certain distance below said machinery deck and upper extent of said reservoir cavity, thereby to provide a selected ullage volume above the maximum visible fill level of liquid within said reservoir cavity.

11. The automotive fluid service machine of claim 7 wherein said cap portion includes a housing portion providing a chamber receiving said pump, said housing portion including a control panel opening, a control panel fitted into and secured to said cap portion at said opening, and a liquid flow indicator carried on said control panel and in fluid flow series with said pump.

12. The automotive fluid service machine of claim 7 wherein said base portion adjacent to an upper extent thereof defines a boss circumscribed by a ledge, said cap portion including a skirt section circumscribing in close fitting relation to said boss and including a downwardly disposed end edge engaging upon said ledge, and fasteners securing said skirt section to said boss to unite said cap portion said base portion.

13. The automotive fluid service machine of claim 12 wherein said fasteners securing said skirt section to said boss are disposed at the upper extent of an ullage volume defined within said reservoir cavity above a maximum visible fill level of liquid within said reservoir cavity.

14. An automotive fluid service machine, said machine comprising:

a cabinet, said cabinet having a unitary chambered base portion with a lower wall, side walls, and a top wall all integral with one another and cooperatively defining a reservoir cavity within said base portion, said top wall upwardly defining a machinery deck;

a pump secured to said machinery deck and having a suction tube communicating with a lower extent of said reservoir cavity to withdraw liquid therefrom;

a cap portion of said cabinet covering said machinery deck and providing environmental protection to said pump; and wherein said cap portion outwardly defines a basin having a downwardly extending spigot opening from a bottom of said basin and extending downwardly through an opening defined by said upper wall to provide fluid flow from said basin into said reservoir cavity.

15. The automotive fluid service machine of claim 14 further including a grate disposed in a lower extent of said basin to provide drainage for articles placed therein without allowing said articles to fall into said reservoir cavity.

16. The automotive fluid service machine of claim 14 further including a lid member hinged to said cap portion and by its own weight overlying said basin, in an open position said lid allowing fluid to be poured into said reservoir cavity via said basin.

* * * * *